United States Patent
Hsieh

(10) Patent No.: US 7,341,129 B2
(45) Date of Patent: Mar. 11, 2008

(54) DOUBLE-SIDED DOOR BRAKING EQUIPMENT FOR A OPERATOR

(76) Inventor: Chung-Hsien Hsieh, 116 Fen Liao Road, Sec. 1, Lin-Kou Hsiang, Taipei Hsien (TW)

(*) Notice: Subject to any disclaimer, the term of this patent is extended or adjusted under 35 U.S.C. 154(b) by 0 days.

(21) Appl. No.: 11/446,651

(22) Filed: Jun. 5, 2006

(65) Prior Publication Data

US 2007/0278053 A1 Dec. 6, 2007

(51) Int. Cl.
*B60T 13/04* (2006.01)
(52) U.S. Cl. ............... 188/171; 160/188; 160/298; 49/139; 49/199
(58) Field of Classification Search ........... 188/171, 188/161, 163, 164; 160/188, 189, 298, 299, 160/8; 49/139, 199
See application file for complete search history.

(56) References Cited

U.S. PATENT DOCUMENTS 3,853,167 A * 12/1974 Wardlaw ............... 160/133
6,055,885 A   5/2000 Shea
6,092,582 A * 7/2000 Liu ....................... 160/310
2002/0111242 A1* 8/2002 Balli et al. ............ 475/149
2005/0172559 A1  8/2005 Hsieh

* cited by examiner

*Primary Examiner*—Robert A. Siconolfi
*Assistant Examiner*—Vu Q. Nguyen
(74) *Attorney, Agent, or Firm*—Collard & Roe, P.C.

(57) ABSTRACT

This invention relates to a double-sided equipment for a braking system, comprising a first braking pad, a second braking pad, a braking component, a fixing spring component, a compression spring, and an electromagnet, wherein the braking component located between the first braking pad and the second braking pad is movable along the axle of the door operator but is unrotatable with respect to the door operator axle. As a result of the compression spring, the first braking pad and the braking component will be pushed together towards the second braking pad, thereby the braking component is clamped from its two sides by the two braking pads. When the first braking pad is retracted by the electromagnet, the fixing spring enables the braking component to separate from the second braking pad, causing the braking component to be fully separated from the first and second braking pads.

8 Claims, 5 Drawing Sheets

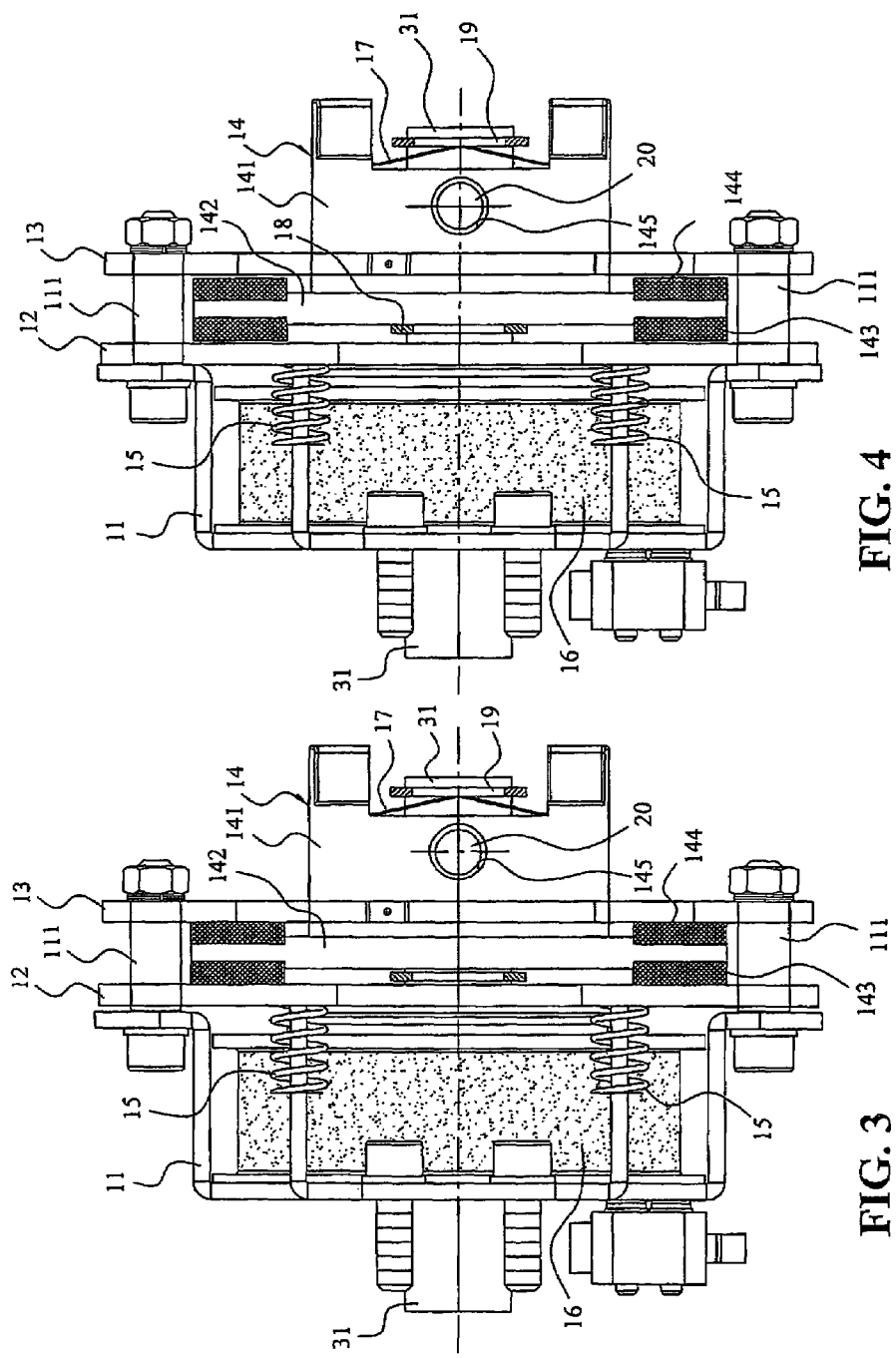

DOUBLE-SIDED DOOR BRAKING EQUIPMENT FOR A OPERATOR

TECHNICAL FIELD

This invention relates to a braking equipment for a door operator, particularly a double-sided braking equipment having a braking component with a braking disk which is movable axially.

BACKGROUND OF THE INVENTION

A door operator that is generally used for a vertical door, such as a vertically lifted roll-up door or a garage door, has at least one braking equipment used to brake the door operator and maintain the rolled-up door or door panel at a specific position or a stationary position. A braking equipment of this type, such as Applicant granted U.S. Pat. No. 6,055,885, is usually designed to retract a braking pad pushed by a spring to release a braking state by means of an electromagnet without the braking pad resting on a brake lining of a braking component during opening or closing a door through actuating the door operator. When the door operator stops running, and the electromagnet is switched off, the door operator is maintained in a braking state.

In another patent of Applicant, U.S. Pat. No. 7,055,283, a braking equipment for a door operator with a small load is introduced. As the load applied on the door operator is always not heavy, it is possible to use a compression spring with a lower spring force to brake such a door operator. Due to the lower spring force, an electromagnet is not required to retract the braking pad. As long as the door operator is actuated, the force generated by the door operator is sufficient to overcome the braking force generated by the compression spring, and thus a roll-up door or door panel is drawn. Braking equipment of this type is only suitable for the door operator which is adapted for a small roll-up door or door panel. In addition, due to the absence of the electromagnet, the cost of the braking equipment may be reduced, and a more compact one may be developed.

The well-known braking equipments used for a door operator, such as the two braking equipments described above, provide the braking force only by a single braking pad being pushed against the braking component for the door operator, and the braking component is unmovable along an axle of the door operator and unrotatable with respect to the axle. In other words, a well-known fastener or a commonly-known fixed-connection means is used to fix the braking component onto the axle. At this moment, the braking component and axle must in substance be seen as the same rigid body in order to convert the braking force applied on the braking component into an effective torque for the axle of the door operator and brake the door operator. Nevertheless, using a single-sided braking equipment provides insufficient braking force to brake a door operator with relatively higher loads, such as large roll-up doors or large door panels. This could result in problems related to safety.

On the other hand, while the spring exerts a pushing force on the braking component, a counteracting force opposite to the pushing force is applied on the connection of the braking component to the axle. The counteracting force acts on the connection continually and/or periodically, and thus the connection is possible to be damaged. In addition, in order to increase the braking force of the single-sided braking equipment, the pushing force from the spring is increased. Consequently the wear rate of the brake lining of the braking component and the counteracting force applied on the connection are also increased. The aforesaid will have negative effects to the braking equipment.

SUMMARY OF INVENTION

Bearing in mind the problems and deficiencies of prior art, it is therefore an object of the present invention to provide a double-sided braking equipment in which the braking force increased by means of two braking pads arranged on both sides of the braking component respectively is higher than the conventional braking equipment.

It is another object of the present invention to provide a double-sided braking equipment which improves the braking effects of the conventional braking equipment by a simple means without increasing costs.

It is another object of the present invention to provide a double-sided braking equipment, which has an increasing brakeage of two stage by means of the braking pads arranged on both sides of the braking component respectively to prevent the door operator from coming under a violent impact during the braking process.

It is another object of the present invention to provide a double-sided braking equipment, which lowers the wear rate by means of the braking pads arranged on both sides of the braking component to further extend the lifetime of the braking lining.

It is another object of the present invention to provide a double-sided braking equipment in which the counteracting force of the pushing force from the spring being applied on the connection of the braking component to the axle is avoided, and thus preventing the connection of the braking component to the axle from being damaged.

According to this invention, a double-sided braking equipment for a door operator is provided, wherein the door operator comprises an axle which is used to draw up or down a vertical roll-up door or door panel and the double-sided braking equipment comprises: a supporting frame with a plurality of guide bars; a first braking pad which is movable in an axial direction of the axle of the door operator by being guided by the guide bars; a second braking pad provided at a tail end of the guide bars; a braking component comprising an axle-connecting portion and a braking disk; a fixing spring component; a compression spring used to push the first braking pad against the braking component toward the second braking pad; and an electromagnet which enable the first braking pad to be retracted such that the first braking pad is separated from the braking component in order to release the braking equipment.

The braking component is arranged on the axle of the door operator in such a way that the axle-connecting portion is movable along the axle of the door operator but unrotatable with respect to the axle of the door operator, and the braking component is arranged on the axle of the door operator such that the braking disk is located between the first and second braking pads. As the braking component is movable along the axle of the door operator, during retraction of the first braking pad the fixing spring component moves the braking component toward the first braking pad to separate the braking component from the second braking pad, thereby the braking component is fully separated from the braking pads.

The aforesaid objects can be achieved according to such a configuration. Still objects and advantages of the invention will be apparent form the specification.

BRIEF DESCRIPTION OF DRAWINGS

The figures are for illustration purposes only and are not drawn to scale. The invention will be more clearly understood by reference to the detailed description which follows taken in conjunction with the accompanying drawings wherein:

FIG. 3 shows the braking state of the embodiment in FIG. 2;

FIG. 4 shows the free state of the embodiment in FIG. 2;

DETAILED DESCRIPTION OF PREFERRED EMBODIMENTS

Figure 1:
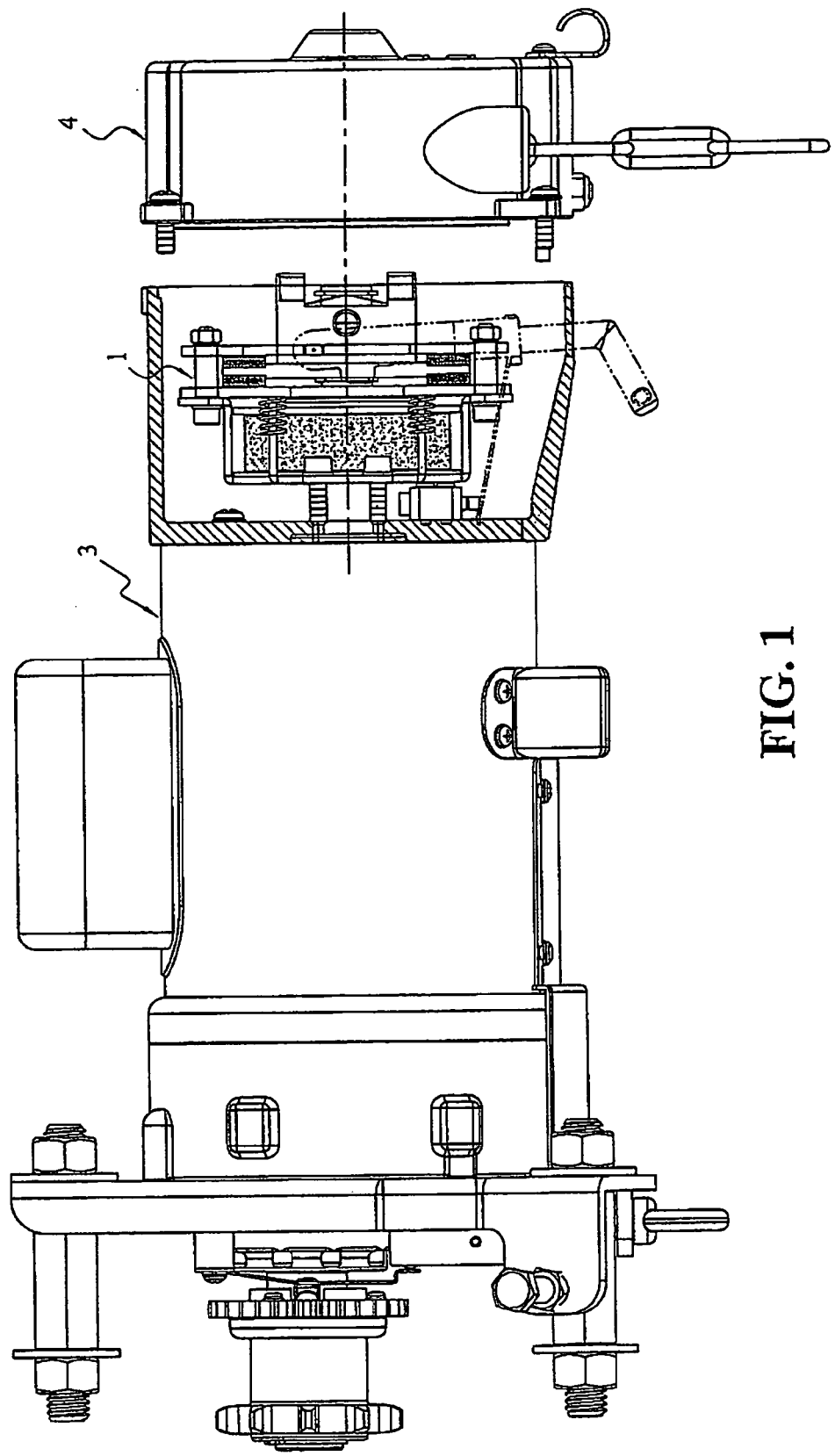
FIG. 1 is an exploded planar view of a door operator comprising the braking equipment and pull-chain disk.
Figure 2:
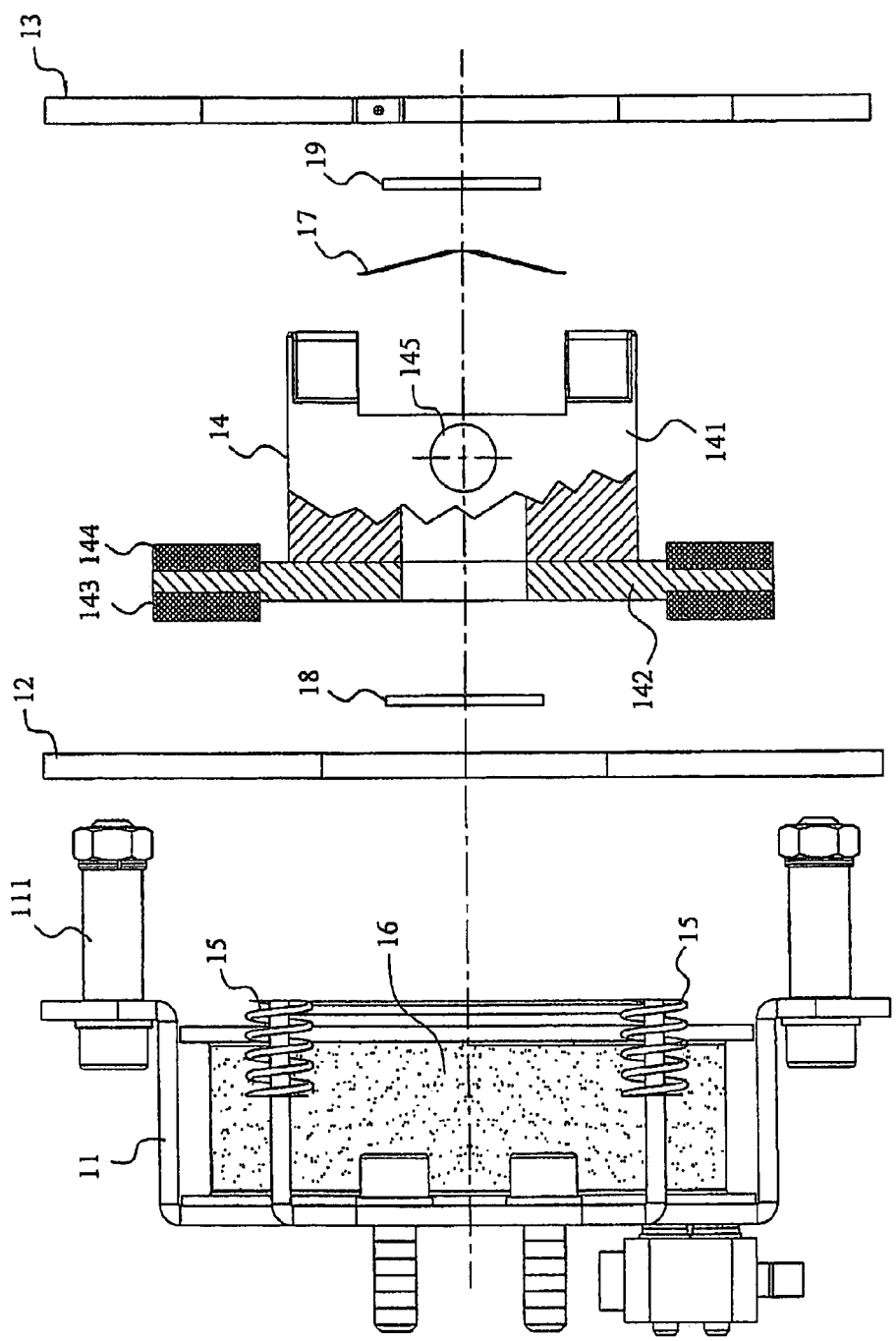
FIG. 2 is an exploded planar view of a preferred embodiment for a double-sided braking equipment according to the present invention.
Figure 5:
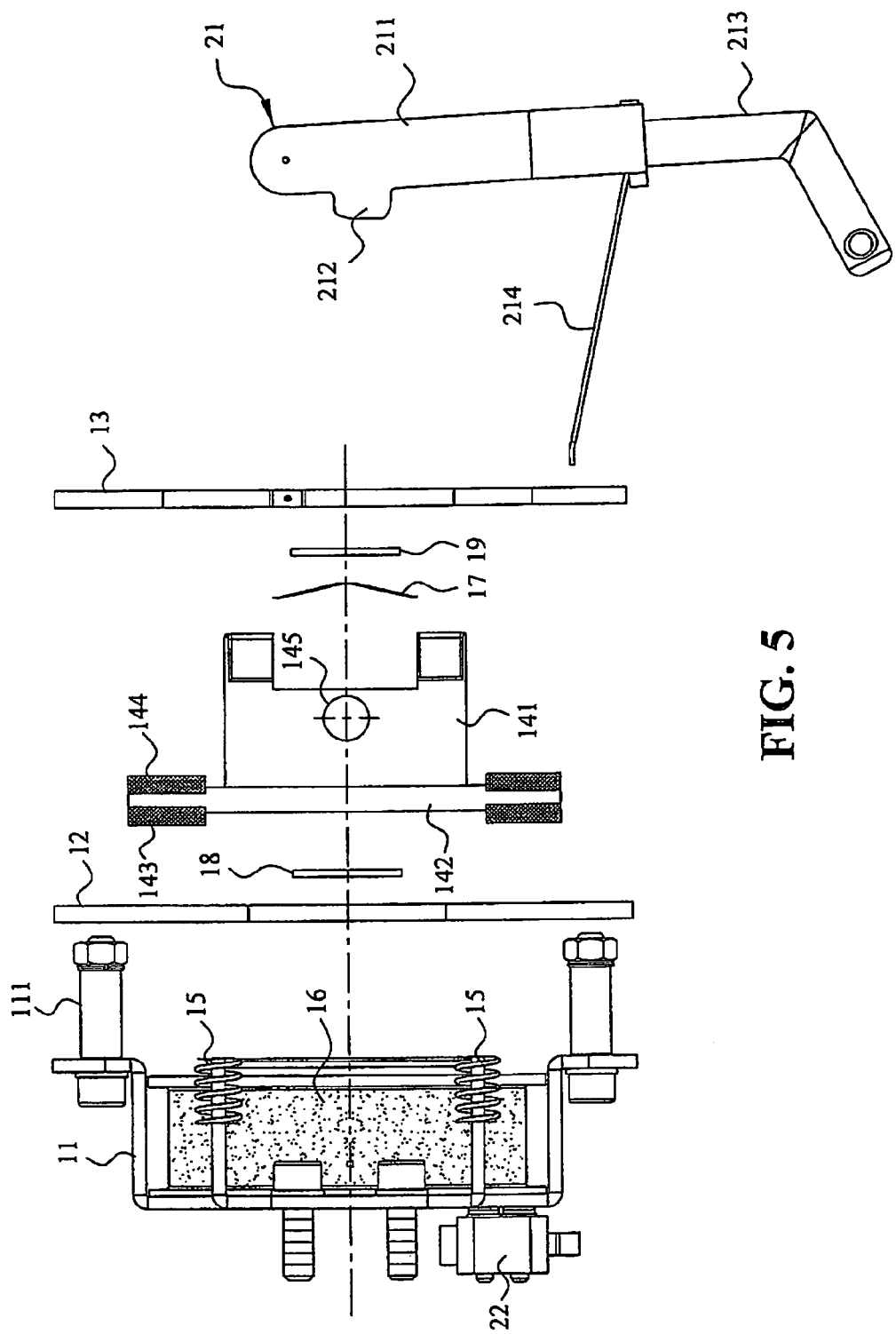
FIG. 5 is an exploded planar view of another preferred embodiment for a double-sided braking equipment according to the present invention.

FIG. 1 is an exploded planar view of the door operator comprising a braking equipment and a pull-chain disk while FIGS. 2 and 5 respectively refer to exploded planar views of different embodiments.

Referring to FIGS. 2 to 4, according to the preferred embodiment of the present invention a double-sided braking equipment 1 comprises: a supporting frame 11 with a plurality of guide bars 111; a first braking pad 12 which is movable in an axial direction of the axle 31 of the door operator 3 by being guided by the guide bars 111; a second braking pad 13 which is fixed to a tail end of the guide bars 111; a braking component 14 comprising an axle-connecting portion 141 and a braking disk 142; a first fastening ring 18 and a second fastening ring 19 that are respectively arranged on both sides of the braking component 14 on the axle 31 of the door operator 3; a fixing spring component 17; and an electromagnet 16 which enables the first braking pad 12 to be retracted.

The supporting frame 11 can be firmly fixed onto a partition board or a housing of the door operator. Alternatively, the supporting frame 11 can also be firmly fixed at a location that does not rotate with the axle 31.

The braking component 14 is arranged on the axle 31 of the door operator 3 in such a way that the axle-connecting portion 141 is movable along the axle 31 of the door operator 3 but unrotatable with respect to the axle 31 of the door operator 3, and the braking component 14 is arranged such that the braking disk 142 is located between the first braking pad 12 and second braking pad 13. Both sides of the braking disk 142 respectively have a first brake lining 143 on which the first braking pad 12 is used to rest and a second brake lining 144 on which the second braking pad 13 is used to rest.

The first fastening ring 18 is arranged on the axle 31 of the door operator 3 and located on one side of the braking component 14 that faces the first braking pad 12, and the second fastening ring 19 is arranged on the axle 31 of the door operator 3 and located opposite to the side of the braking component 14 that faces the first braking pad 12.

The fixing spring component 17 is arranged between the braking component 14 and the second fastening ring 19.

The first fastening ring 18 and the second fastening ring 19 can be used to limit the range of the movement for the braking component 14, as well as provide the axial support for the braking component 14. The second fastening ring 19 can also support the fixing spring component 17.

The compression spring 15 is arranged opposite to one side of the first braking pad 12 that faces the braking component 14. Under normal conditions, the compression spring 15 stores potential energy of spring by being compressed, and is thus able to push the first braking pad 12 toward the second braking pad 13 against the braking component 14. As the braking component 14 is movable along the axle 31 of the door operator 3, when the first braking pad 12 is pushed against the braking component 14, the first braking pad 12 and the braking component 14 are pushed together toward the second braking pad 13, thereby the braking component 14 is clamped from its two side by the first braking pad 12 and the second braking pad 13. At this moment, the braking equipment 1 is maintained in a braking state, as shown in FIG. 3. It is noted that at this moment, the first braking pad 12 and the second braking pad 13 are tightly connected to the first brake lining 143 and the second brake lining 144 of the braking disk 142 respectively.

During the braking component 14 being pushed by the first braking pad 12 toward the second braking pad 13, the fixing spring component 17 stores potential energy of spring through being compressed.

The electromagnet 16 is arranged opposite to the side of the first braking pad 12 that faces the braking component 14. When the electromagnet 16 is switched on, the electromagnet 16 retracts the first braking pad 12 to separate the first braking pad 12 from the first brake lining 143 on the braking component 14 so as to release the braking equipment 1.

As the braking component 14 is movable along the axle 31 of the door operator 3, during retraction of the first braking pad 12 by means of the electromagnet 16, the fixing spring component 17 releases its potential energy of spring and moves the braking component 14 toward the first braking pad 12 such that the second brake lining 144 on the braking component 14 is separated from second braking pad 13. At this moment, the braking equipment 1 is in a free state, as shown in FIG. 4. It is noted that at this moment, the braking component 14 is pushed against the first fastening ring 18 by the fixed spring component 17, and the first brake lining 143 and the second brake lining 144 on the braking disk 142 are out of contact with the first braking pad 12 and the second braking pad 13.

For a person skilled in the art, there will be no difficulties in attaching the braking component 14 onto the axle 31 of the door operator 3 in such a way that it is movable along the axle 31 of the door operator 3 but unrotatable with respect to the axle 31 of the door operator 3. In the illustrated embodiment, a hole 145 is formed in the axle-connecting portion 141 of the braking component 14 in the radial direction of the axle 31. A pin 20 passes through the hole 145 in the axle-connecting portion 141, while the pin 20 extends and inserts into the axle 31 of the door operator 3. If the diameter of the hole 145 is larger than the diameter of the pin 20, there will be a gap between the hole 145 and the pin 20. The braking component 14 is movable or slidable along the axle 31 of the door operator 3 within the scope that is permitted by the gap. Another solution (not shown) is forming the axle 31 with a cross-sectional shape which is other than circular, such as a polygon or an ellipse, and forming the contour of the internal surface of the central hole in the axle-connecting portion with a shape matching with the axle, the central hole being used to be inserted with the axle. This will enable the braking component to move or slide along the axle of the door operator but prevent it from rotating with respect to the axle.

In addition, there are no specific requirements for the distance that the braking component 14 is able to move or slide along the axle 31 of the door operator 3, as long as it allows the braking component 14 to be separated from the second braking pad 13.

When the braking component 14 is pushed toward the first braking pad 12 against the first fastening ring 18 by the fixing spring component 17, the counteracting force that corresponds to the pushing force of the fixing spring component 17 acts on the first fastening ring 18 and not on the pin 20. It is possible for the embodiment of the present invention to skip the first fastening ring 18. Although the pushing force of the fixing spring component 17 is not large, in the case without the first fastening ring 18, the counteracting force that corresponds to the pushing force of the fixing spring component 17 will act directly on the pin 20. On the other hand, thanks to the arrangement of the fastening rings, it is easier to limit the range of the movement for the braking component 14. Therefore, the preferred embodiment of the present invention is preferably provided with the first fastening ring 18.

Furthermore, there are no specific requirements for the spring force that the fixing spring component 17 needs to have, as long as it provides sufficient force to move the braking component 14 and enable the braking component 14 to be separated from the second braking pad 13. Although the fixing spring is preferably arranged between the braking component and the second braking pad according to the embodiment of the present invention, it is possible to replace the fixing spring with other forms or types of elastic components, or to arrange the elastic component on the side of the braking component that faces the first braking pad. In the case that the elastic component is arranged on the side of the braking component that faces the first braking pad, during the first braking pad being pushing the braking component toward the second braking pad, the elastic component stores potential energy of spring by being pulled. In the case of this arrangement, both ends of the elastic component must be firmly fixed, and then it is possible to pull the elastic component. One end of the elastic component is fixed onto the braking component, while another end can be directly fixed onto the door operator axle or indirectly fixed onto the door operator axle, for example, fixed onto the first fastening ring. As compared with other methods, arranging a fixing spring component between the braking component and the second braking pad is a simpler method since all that is required is the positioning of a spring.

According to the embodiment in the present invention, the second braking pad is preferably fixed on the tail end of the guide bars. However, if the second braking pad is movable along the guide bars as the first braking pad without being firmly fixed onto the tail end of the guide bars, the second braking pad would not be inclined to move toward the braking component in a free state. Consequently, when the electromagnet retracts the first braking pad, the braking component will be moved by the fixing spring component, and will naturally be separated from the second braking pad. It is therefore possible not to firmly fix the second braking pad on the tail end of the guide bars.

Figure 7:
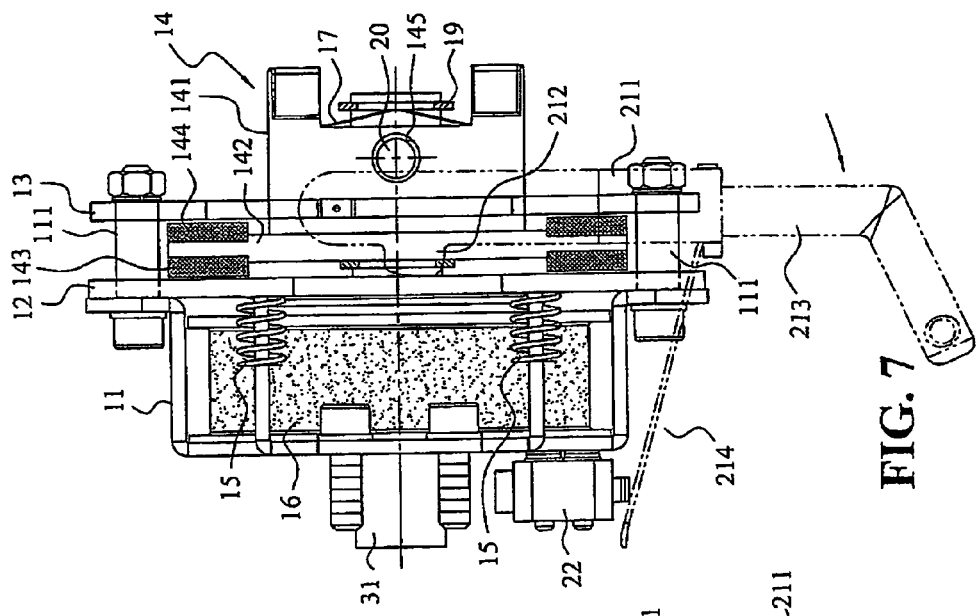
FIG. 7 shows the free state of the embodiment in FIG. 5.
Figure 6:
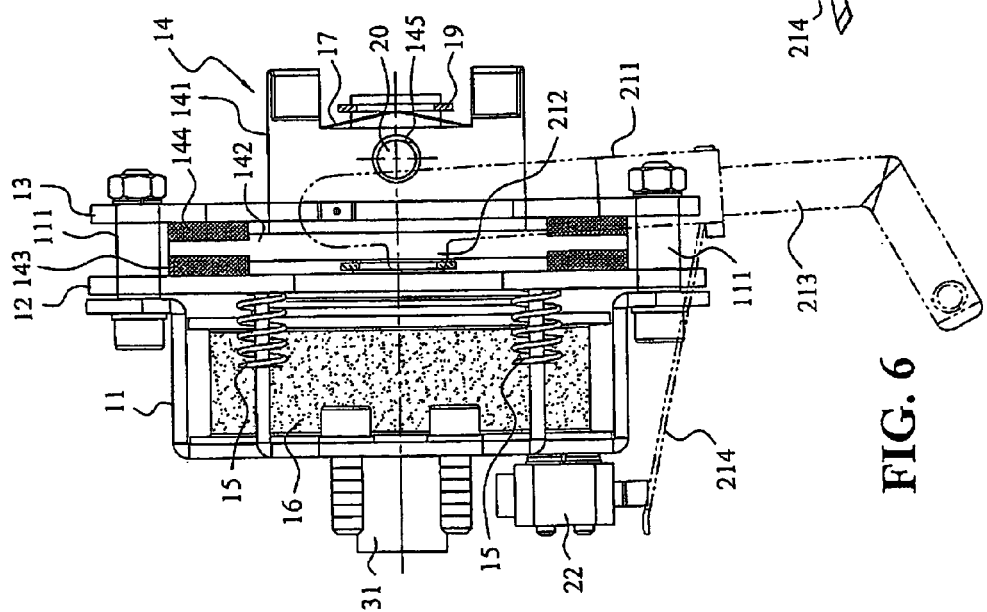
FIG. 6 shows the braking state of the embodiment in FIG. 5.

Referring to FIGS. 5 to 7, according to another preferred embodiment of the present invention, the double-sided braking equipment 1 comprises: a supporting frame 11 with a plurality of guide bars 111; a first braking pad 12 which is movable in an axial direction of the axle 31 of the door operator 3 by being guided by the guide bars 111; a second braking pad 13 that is fixed to the tail end of the guide bars 11; a braking component 14 that comprises an axle-connecting portion 141 and a braking disk 142; a first fastening ring 18 and a second fastening ring 19 that are respectively arranged on both sides of the braking component 14 on the axle 31 of the door operator 3, a fixing spring component 17; and an electromagnet 16 which enables the first braking pad 12 to be retracted. The braking equipment 1 further has a manual release component 21 pivotably installed on the second braking pad 13, and the manual release component 21 can be operated by hand to push the first braking pad 12 away from the braking component 14.

Figure 8:
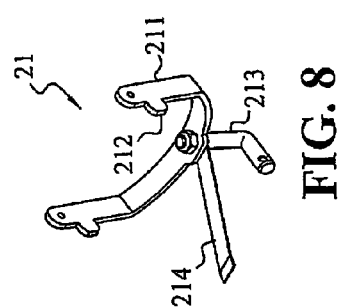
FIG. 8 is a perspective view of the manual release component.

It is shown in FIG. 8 that the manual release component 21 has a U-shaped part 211 and a pulling bar 213, and the manual release component 21 that is pivotably installed on the second braking pad 13 through the two tail ends of the U-shaped part 211, and the pulling bar 213 can be used to operate the manual release component 21. The U-shaped part 211 can further comprise a protrusion 212 that protrudes towards the first braking pad 12. The manual release component 21 can further comprise a trigger arm 214. The trigger arm 214 actuates the sensor switch 22 while the manual release component 21 is operated to push the first braking pad 12. The sensor switch 22 can be connected to the door operator 3, or connected to an external control equipment or monitoring equipment, and the sensor switch 22 is used to cut off the electricity to the door operator 3 or to shut down the door operator 3.

In the event of power failure, the braking equipment 1 will be maintained in a braking state, as shown in FIG. 6. At this moment, due to the operation of the pulling bar 213 the protrusion 212 of the U-shaped part 211 is pushed against the first braking pad 12, and the first braking pad 12 is pushed away from the braking component 14 in order to release the braking equipment 1, as shown in FIG. 7. In the event of the electromagnet failure or in any circumstance, it is possible to operate the manual release component 21 to push the first braking pad 12 away from the braking component 14 in order to release the braking equipment 1, as well as cut off the electricity to the door operator 3 and shut down the door operator 3 at the same time. After releasing the door operator 3 from its braking state, the user can manually raise or lower the roll-up door or door panel by means of the pull-chain disk 4.

Furthermore, according to the double-sided braking equipment of the present invention, due to the fact that the braking force is provided by two brake linings, two brake linings with relatively smaller surface areas are used to provide a braking force corresponding to one generated by a single and larger brake lining of prior art. As compared to prior art, the double-sided braking equipment in the present invention can use brake linings with relatively smaller surface areas, and therefore, the dimensions of the braking disc and the braking pads can be reduced. This allows the double-sided braking equipment to be compact.

While the present invention has been described in reference to the aforesaid embodiments, it should be understood that numerous changes and modifications could be made within the spirit and scope of the present invention. Therefore, it is intended that the present invention not be limited to the disclosed embodiments, but the invention has full scope permitted by the language of the following claim.

EXPLANATION OF MAIN COMPONENTS

01: Braking equipment
04: Pull-chain disk
11: Supporting frame
111: Guide bar
12: First braking pad
13: Second braking pad
14: Braking component
141: Axle-connecting portion
142: Braking disk
143: First brake lining
144: Second brake lining
145: Hole
15: Compression spring
16: Electromagnet
17: Fixing spring component
18: First fastening ring
19: Second fastening ring
20: Pin
21: Manual release component
211: U-shaped part
212: Protrusion
213: Pulling bar
214: Trigger arm
22: Sensor switch
03: Door operator
31: Axle

I claim:

1. A double-sided braking equipment for a door operator, the door operator comprising an axle, which is used to draw up or down a vertical roll-up door or door panel, the braking equipment being used to brake the axle of the door operator and comprising:

a supporting frame firmly fixed onto a partition board of the door operator, the supporting frame comprising a plurality of guide bars;

a first braking pad, which is movable in an axial direction of the axle by being guided by the guide bars;

a second braking pad provided at a tail end of the guide bars;

a braking component comprising an axle-connecting portion and a braking disk, the braking component being arranged on the axle of the door operator in such a way that the axle-connecting portion is movable in an axial direction along the axle of the door operator and is rotatable together with the axle of the door operator, and the braking component being arranged such that the braking disk is located between the first braking pad and second braking pad;

a compression spring arranged opposite to one side of the first braking pad facing the braking component, the compression spring being used to push the first braking pad against the braking component toward the second braking pad;

an electromagnet arranged opposite to the side of the first braking pad facing the braking component, the electromagnet enabling the first braking pad to be retracted such that the first braking pad is separated from the braking component in order to release the braking equipment;

a first fastening ring arranged on the axle of the door operator and located on one side of the braking component facing the first braking pad, a second fastening ring arranged on the axle of the door operator and located opposite to the side of the braking component facing the first braking pad; and a fixing spring component located between the braking component and the second fastening ring, and as the braking component is movable in an axial direction along the axle of the door operator, during retraction of the first braking pad the fixing spring component pushes the braking component towards the first braking pad so as to separate the braking component from the second braking pad.

2. The braking equipment as claimed in claim 1, wherein the second braking pad is fixed to the tail end of the guide bars, and both sides of the braking disk respectively have a first brake lining on which the first braking pad is used to rest and a second brake lining on which the second braking pad is used to rest.

3. The braking equipment as claimed in claim 2, wherein the braking equipment further comprises a manual release component pivotably installed on the second braking pad and able to be operated by hand to push the first braking pad away from the first brake lining of the braking component.

4. The braking equipment as claimed in claim 3, wherein the manual release component further comprises a U-shaped part and a pulling bar, and the manual release component is pivotably installed on the second braking pad through two tail ends of the U-shaped part, and the pulling bar is used to operate the manual release component.

5. The braking equipment as claimed in claim 3, wherein the braking equipment further comprises a sensor switch, and the manual release component actuates the sensor switch while the manual release component is operated to push the first braking pad.

6. The braking equipment as claimed in claim 5, wherein the sensor switch can be connected to the door operator, and the sensor switch is used to shut down the door operator.

7. The braking equipment as claimed in claim 5, wherein the manual release component comprises a U-shaped part, a pulling bar and a trigger arm, the manual release component being pivotably installed on the second braking pad through two tail ends of the U-shaped part, the pulling bar being used to operate the manual release component, and the trigger arm actuating the sensor switch while the manual release component is operated to push the first braking pad.

8. The braking equipment as claimed in claim 7, wherein the sensor switch can be connected to the door operator, and the sensor switch is used to shut down the door operator.

* * * * *